J. M. FINCH.
Hoppers and Casings for Grinding Mills.

No. 137,429. Patented April 1, 1873.

UNITED STATES PATENT OFFICE.

JOHN M. FINCH, OF CEDAR FALLS, IOWA, ASSIGNOR TO J. M. FINCH AND URIAL TORREY.

IMPROVEMENT IN HOPPERS AND CASINGS FOR GRINDING-MILLS.

Specification forming part of Letters Patent No. 137,429, dated April 1, 1873; application filed February 11, 1873.

*To all whom it may concern:*

Be it known that I, JOHN M. FINCH, of Cedar Falls, in the county of Black Hawk and State of Iowa, have invented certain new and useful Improvements in Portable Grinding-Mills; and I do hereby declare that the following is a full, clear, and exact description thereof, reference being had to the accompanying drawing and to the letters of reference marked thereon which form a part of this specification.

My invention relates to improvements in the construction and arrangement of grinding-mills; and the invention consists in a new and improved combination of devices, consisting of a removable hopper having branched feeding-tubes and a removable casing so arranged with relation to the grinders that when in operation the feed is delivered at the proper point on both sides of the latter, and when the grinders require dressing or repair the casing and hopper are easily removed therefrom, all as hereinafter more fully set forth.

In order to enable others skilled in the art to which my invention appertains to make and use the same, I will now proceed to describe its construction and operation, referring to the annexed drawing, in which—

Figure 1:
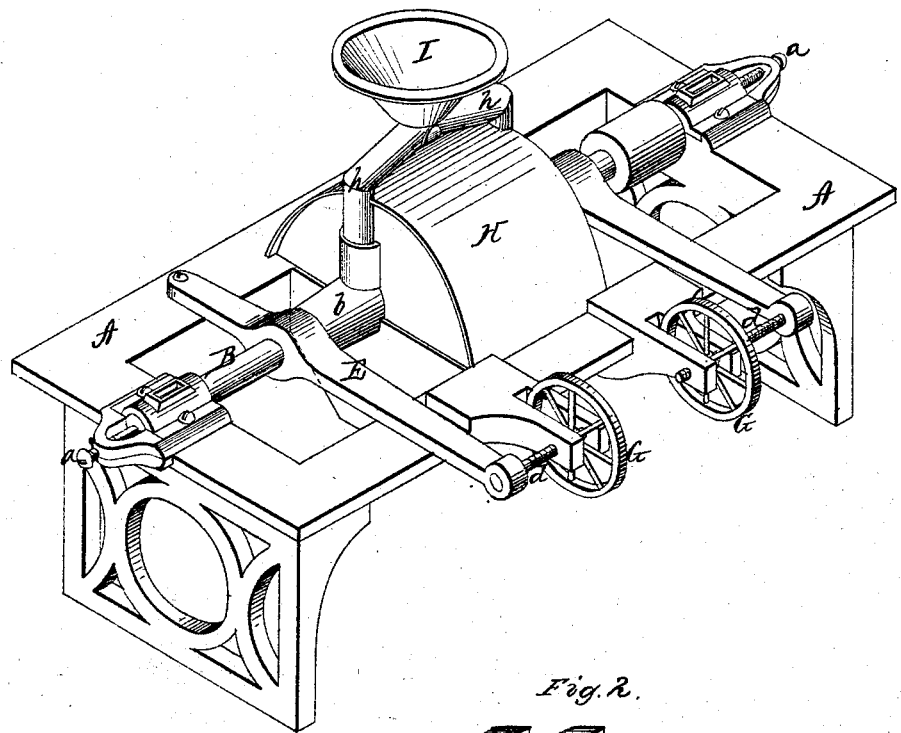
Figure 2:
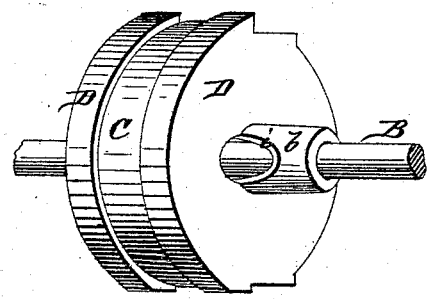

Figure 1 is a perspective view of my entire grinding-mill, and Fig. 2 is a perspective view of the grinders.

A represents the frame of my mill, on which, in suitable boxes, is placed the shaft B, provided with a suitable pulley for the attachment of a belt from any convenient motive power. The shaft B does not, however, rest in the boxes mentioned, but is merely held in proper position by them. It turns upon the ends of pointed screws $a$ $a$, thus reducing the friction to the smallest possible amount. On the shaft B is secured a grinder, C, made of stone or other suitable material, and both sides of which are made for grinding-surfaces. This double-faced grinder revolves with the shaft B. On each side of the revolving grinder C is placed a stationary grinder, D, which are cut with offsets or shoulders to rest on the frame A. Each grinder D is on its outer side provided with a hub, $b$, through which the driving-shaft B passes, and the said stationary grinders are made adjustable to and from the revolving grinder C by means of levers E E pivoted to one side of the frame, and operated on the other side by screw-wheels G G and screws $d$ $d$. The levers E E have holes at or near their center, through which the driving-shaft B passes. Under the grinders is arranged a spout or conductor to receive the ground articles and conduct into receptacles placed underneath. Over the grinders is a casing, H, with a hopper or funnel, I, on top for the reception of the grain, which then passes through tubes $h$ $h$ and holes $i$ in the hubs $b$ into and between the grinders.

Both the casing H and branched hopper or funnel I are made removable, to readily expose the grinders when necessary for dressing or repair.

Having thus fully described my invention, what I claim as new, and desire to secure by Letters Patent, is—

The casing H, being removably fitted in the lower casing, and having removably fitted thereon the hopper I with the two tubes $h$ $h$, and arranged with the grinders D D and C and hubs $b$ $b$, all constructed as and for the purpose set forth.

In testimony that I claim the foregoing as my own I affix my signature in presence of two witnesses.

JOHN MORTIMER FINCH.

Witnesses:
   URIAL TORREY,
   J. ROBERTSON.